(12) United States Patent
Suga (10) Patent No.: US 10,857,836 B2
(45) Date of Patent: Dec. 8, 2020

(54) PNEUMATIC TIRE

(71) Applicant: The Yokohama Rubber Co., LTD., Minato-ku, Tokyo (JP)

(72) Inventor: Yuichi Suga, Hiratsuka (JP)

(73) Assignee: The Yokohama Rubber Co., Ltd.

( * ) Notice: Subject to any disclaimer, the term of this patent is extended or adjusted under 35 U.S.C. 154(b) by 324 days.

(21) Appl. No.: 15/129,806

(22) PCT Filed: Dec. 25, 2014

(86) PCT No.: PCT/JP2014/084411
§ 371 (c)(1),
(2) Date: Sep. 27, 2016

(87) PCT Pub. No.: WO2015/145909
PCT Pub. Date: Oct. 1, 2015

(65) Prior Publication Data
US 2017/0174009 A1 Jun. 22, 2017

(30) Foreign Application Priority Data

Mar. 27, 2014 (JP) .................................. 2014-066692

(51) Int. Cl.
*B60C 11/00* (2006.01)
*B60C 11/03* (2006.01)
*B60C 11/13* (2006.01)

(52) U.S. Cl.
CPC ...... *B60C 11/0332* (2013.01); *B60C 11/0083* (2013.01); *B60C 11/0302* (2013.01);
(Continued)

(58) Field of Classification Search
CPC ............. B60C 11/1376; B60C 11/0332; B60C 11/0302; B60C 11/0083; B60C 11/04;
(Continued)

(56) References Cited

U.S. PATENT DOCUMENTS

| 5,647,925 A | 7/1997 | Sumiya et al. |
| 2011/0079334 A1* | 4/2011 | Bott .................... B60C 11/0302 |
| | | 152/209.14 |

(Continued)

FOREIGN PATENT DOCUMENTS

| DE | 4444970 A1 * | 6/1995 | ............. B60C 11/00 |
| JP | S63-034204 | 2/1988 | |

(Continued)

OTHER PUBLICATIONS

Machine translation of JP09-136511 (no date).*
(Continued)

*Primary Examiner* — Steven D Maki
*Assistant Examiner* — Philip N Schwartz
(74) *Attorney, Agent, or Firm* — Thorpe North & Western (57) ABSTRACT

A pneumatic tire where a profile line (PL1) of a center land portion (X) defined by the center main grooves protrudes outward in a tire radial direction further than a standard profile line, the standard profile line (PL0) being a curved line including all both end points (A1), (A2), (A3), (A4) of center main grooves (14a), (14b) in a tire width direction. Profile lines (PL2), (PL3) of sub-center land portions (Y1), (Y2) and shoulder land portions (Z1), (Z2) defined outward of the center main grooves in the tire width direction protrude outward in the tire radial direction further than the standard profile line, the shoulder land portions (Z1), (Z2) being defined even further outward than the sub-center land portions (Y1), (Y2).

4 Claims, 5 Drawing Sheets

(52) U.S. Cl.
CPC ... *B60C 11/1376* (2013.01); *B60C 2011/0341* (2013.01); *B60Y 2200/00* (2013.01)

(58) Field of Classification Search
CPC ........ B60C 2011/0341; B60C 11/0306; B60Y 2200/00; B60Y 2200/10; B60Y 2200/11
USPC ...................................... 152/209.14, 209.15
See application file for complete search history.

(56) References Cited

U.S. PATENT DOCUMENTS

| | | | |
|---|---|---|---|
| 2014/0166169 A1 | 6/2014 | Tanaka | |
| 2014/0283965 A1* | 9/2014 | Takahashi | ........... B60C 11/0008 152/209.5 |

FOREIGN PATENT DOCUMENTS

| | | | | |
|---|---|---|---|---|
| JP | 04103406 A | * | 4/1992 | ............. B60C 11/13 |
| JP | H07-0164823 | | 6/1995 | |
| JP | 09136511 A | * | 5/1997 | ............. B60C 11/00 |
| JP | 2000142030 A | * | 5/2000 | ......... B60C 11/0083 |
| JP | 2002-029216 | | 1/2002 | |
| JP | 2003-118317 | | 4/2003 | |
| JP | 4408236 | | 2/2010 | |
| JP | 2014-118123 | | 6/2014 | |

OTHER PUBLICATIONS

Machine translation of JP2000-142030 (no date).*
Machine translation of DE-4444970 (no date).*
Machine translation of JP04-103406 (no date).*
International Search Report for International Application No. PCT/JP2014/084411 dated Feb. 24, 2015, 4 pages, Japan.

* cited by examiner

PNEUMATIC TIRE

TECHNICAL FIELD

The present technology relates to a pneumatic tire with steering stability performance and uneven wear resistance performance enhanced in a well-balanced manner.

BACKGROUND ART

To enhance steering stability performance, conventionally, the land portion width of a tread portion is made large so as to ensure tread rigidity. However, an excessively large land portion width results in reduced ground contact pressure at the center position in the tire width direction of the land portion. Accordingly, both end portions in the tire circumferential direction at approximately the center position deform inward toward the land portion. As a result, the footprint length is shortened causing contact with the ground and steering stability performance to be degraded.

Technology relating to enhancement of steering stability performance accompanying enhanced contact with the ground is known (see Japanese Unexamined Patent Application Publication No. 2002-029216A). In such technology, straight-line stability performance, a kind of steering stability performance, is enhanced by forming a land portion in a curved shape protruding outward in the tire radial direction.

As described in Japanese Unexamined Patent Application Publication No. 2002-029216A, by forming a land portion in a curved shape protruding outward in the tire radial direction, contact with the ground is enhanced. Note that the method of determining the curved shape described in Japanese Unexamined Patent Application Publication No. 2002-029216A employs one type of road contact surface profile line extending over the whole of the tread surface in the tire width direction.

SUMMARY

In recent years, there has been a demand for the development of a pneumatic tire capable of superior uneven wear resistance performance as well as superior steering stability performance.

The present technology was made in light of the foregoing, and provides a pneumatic tire with steering stability performance and uneven wear resistance performance enhanced in a well-balanced manner.

A pneumatic tire of the present technology comprises on either side of a tire equatorial plane in a tire width direction, one center main groove extending in a tire circumferential direction; one shoulder main groove extending in the tire circumferential direction outward from the center main groove in the tire width direction; and five types of land portions extending in the tire circumferential direction, the land portions being defined by the four main grooves; wherein in a tire meridian cross-section, a curved line including all both end points of the two center main grooves in the tire width direction is defined as a standard profile line; a profile line of a center land portion defined by the two center main grooves protrudes outward in the tire radial direction further than the standard profile line; and profile lines of sub-center land portions and shoulder land portions defined outward of the two center main grooves in the tire width direction protrude outward in the tire radial direction further than the standard profile line, the shoulder land portions being defined further outward than the sub-center land portions, the profile lines of the sub-center land portions and the shoulder land portions each including an outermost point of the corresponding center main groove in the tire width direction and both end points of the corresponding shoulder main groove in the tire width direction and being present on either side of the tire equatorial plane in the tire width direction.

In the pneumatic tire according to the present technology, the profile lines of the land portions defined in the tread portion are enhanced. As a result, a pneumatic tire according to the present technology can enhance steering stability performance and uneven wear resistance performance in a well-balanced manner.

BRIEF DESCRIPTION OF THE DRAWINGS

FIGS. 3A and 3B are plan views illustrating ground contact patch forms of pneumatic tires.

DETAILED DESCRIPTION

Embodiments of the pneumatic tire according to the present technology (including Basic Embodiment and Additional Embodiments 1 and 2) will now be described based on the drawings. Note that the present technology is not limited to these embodiments. The constituents of the embodiments include constituents that can be easily replaced by those skilled in the art and constituents substantially the same as the constituents of the embodiment. In addition, the various modes included in these embodiments can be combined as desired within the scope of obviousness by a person skilled in the art.

Basic Embodiment

A basic embodiment of the pneumatic tire according to the present technology will now be described. In the following description, "tire radial direction" refers to a direction orthogonal to the axis of rotation of a pneumatic tire; "inward in the tire radial direction" refers to a side that is near to the axis of rotation in the tire radial direction; and "outward in the tire radial direction" refers to a side that is far from the axis of rotation in the tire radial direction. "Tire circumferential direction" refers to a circumferential direction with the axis of rotation as the center axis. Furthermore, "tire width direction" refers to a direction parallel to the axis of rotation; "inward in the tire width direction" refers to a side that is near to a tire equatorial plane (tire equatorial line) in the tire width direction; and "outward in the tire width direction" refers to a side that is far from the tire equatorial plane in the tire width direction. Note that "tire equatorial plane" refers to a plane that is orthogonal to the axis of rotation of the pneumatic tire and that passes through the center of the pneumatic tire along the width thereof.

Figure 1:
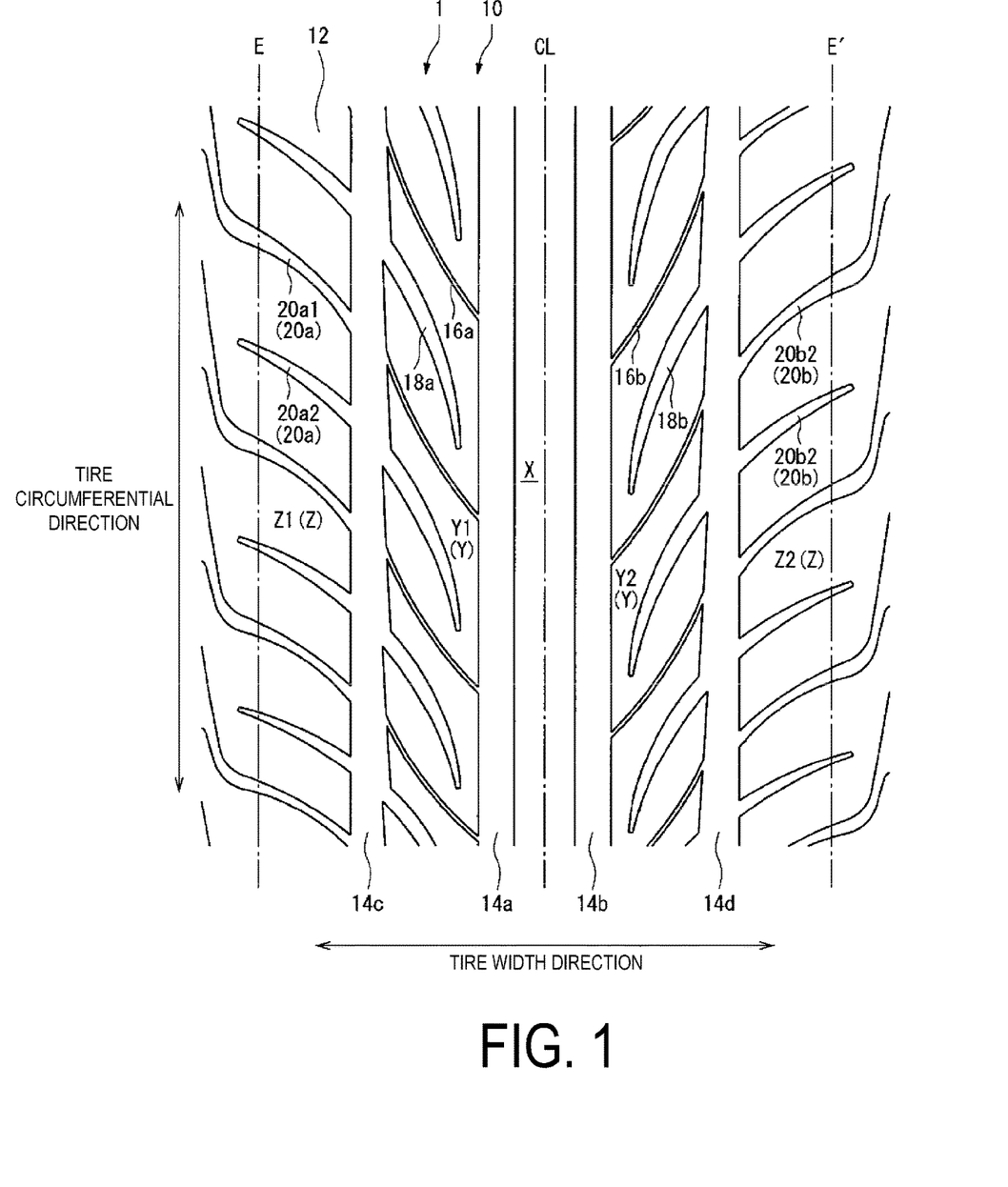
FIG. 1 is a plan view of a tread surface of a pneumatic tire according to an embodiment of the present technology.

FIG. 1 is a plan view of a tread surface of a pneumatic tire according to an embodiment of the present technology. Note that in FIG. 1, the reference sign CL denotes the tire equatorial plane, and the reference signs E, E' denote ground contact edge lines of the pneumatic tire. Also to note is that the tread pattern illustrated in FIG. 1 is a pattern with the sides on either side of the tire equatorial plane CL in the tire width direction being symmetrical.

A tread portion 10 of the pneumatic tire 1 is formed from a rubber material (tread rubber) and is exposed on the outermost side of the pneumatic tire 1 in the tire radial direction. The surface of the tread portion 10 constitutes the contour of the pneumatic tire 1. The surface of the tread portion 10 forms a tread surface 12 that is a surface that comes into contact with the road surface when a vehicle (not illustrated) on which the pneumatic tire 1 is mounted is driven.

The tread surface 12, as illustrated in FIG. 1, is provided with four circumferential grooves 14a, 14b, 14c, 14d extending in the tire circumferential direction separated by a predetermined interval in the tire width direction. The circumferential grooves 14a, 14c are formed on one side of the tire equatorial plane CL in the tire width direction, and the circumferential grooves 14b, 14d are formed on the other side. Hereinafter, the circumferential grooves 14a, 14b may be referred to as "center main grooves", and the circumferential grooves 14c, 14d may be referred to as "shoulder main grooves".

Note that in the present embodiment, the circumferential grooves 14a to 14d are not limited to being grooves that extend in the tire circumferential direction in a linear manner as illustrated in FIG. 1 and may extend in the tire circumferential direction in a wave-like or zigzag-like manner having an amplitude in the tire width direction.

Additionally, the tread surface 12, as illustrated in FIG. 1, is provided with first inclined grooves 16a (16b) at a certain pitch in the tire circumferential direction. The first inclined grooves 16a (16b) connect the center main groove 14a (14b) approximate to the tire equatorial plane CL and the shoulder main groove 14c (14d) distanced from the tire equatorial plane CL.

As illustrated in FIG. 1, the tread surface 12 is further provided with second inclined grooves 18a (18b) at a certain pitch in the tire circumferential direction. The second inclined grooves 18a (18b) extend from the shoulder main groove 14c (14d) inward in the tire width direction and terminate within the land portion.

Furthermore, the tread surface 12, as illustrated in FIG. 1, is provided with third inclined grooves (lug grooves) 20a (20b) at a certain pitch in the tire circumferential direction. The third inclined grooves 20a (20b) extend from the shoulder main groove 14c (14d) beyond the ground contact edge line E (E') outward in the tire width direction. Note that the third inclined grooves 20a (20b) include two types of grooves 20a1 and 20a2 (20b1 and 20b2) having different shapes extending outward in the tire width direction beyond the ground contact edge line E (E') in particular. These two types of grooves are alternately provided in the tire circumferential direction.

Accordingly, in the present embodiment, five types of land portions (center land portion X, sub-center land portions Y1, Y2, shoulder land portions Z1, Z2) are defined by the grooves 14a, 14b, 14c, 14d, 16a, 16b, 18a, 18b, 20a, 20b. Note that the center land portion X is a rib, and the sub-center land portions Y1, Y2 and the shoulder land portions Z1, Z2 are blocks.

Figure 2:
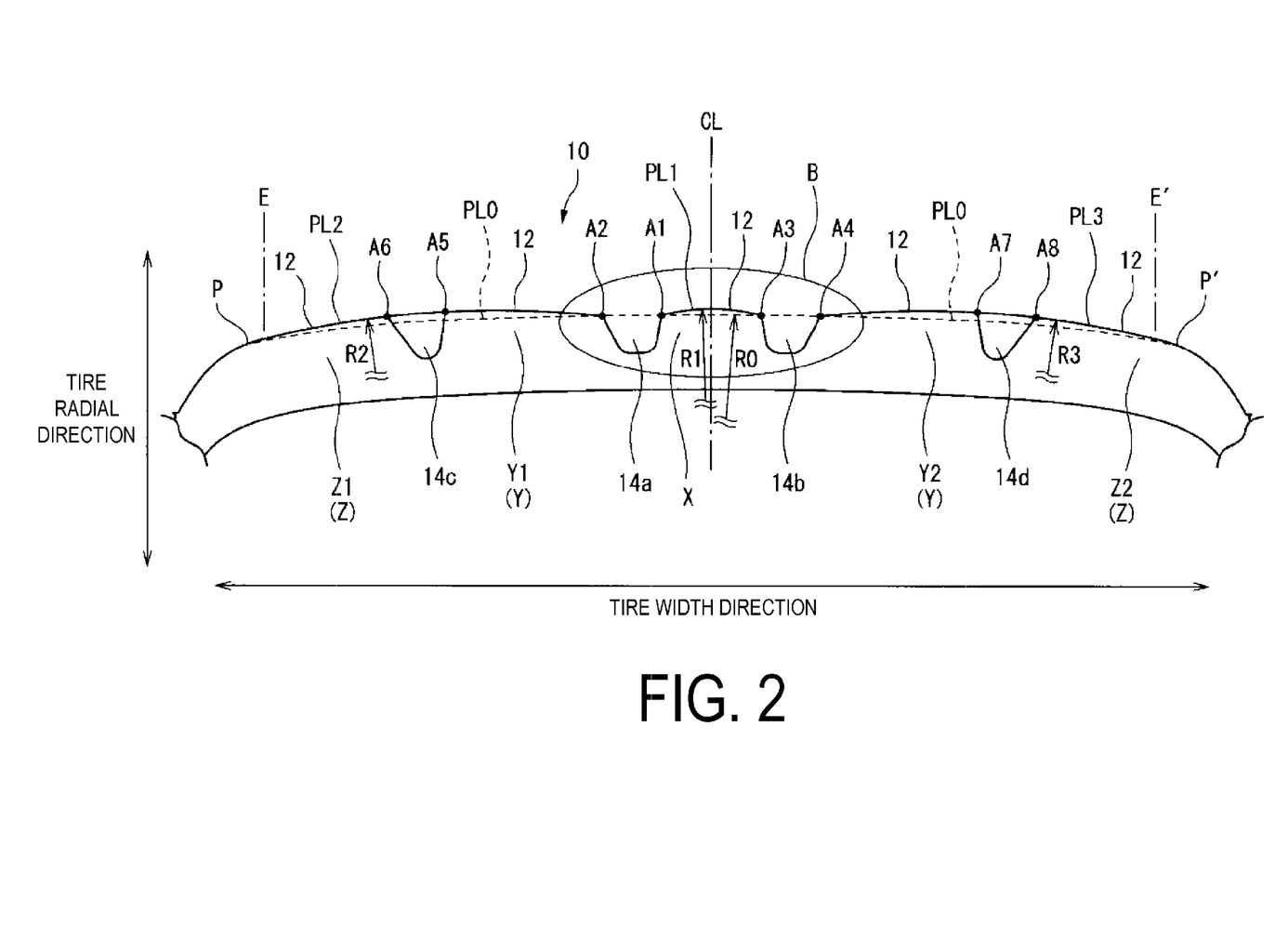
FIG. 2 is a tire meridian cross-sectional view of the tread portion of the pneumatic tire illustrated in FIG. 1.

FIG. 2 is a meridian cross-sectional view of the tread portion of the pneumatic tire illustrated in FIG. 1. Members in FIG. 2 that share reference signs with those in FIG. 1 denote the same member.

As illustrated in FIG. 2, both end points of the center main grooves 14a, 14b in the tire width direction are taken as A1, A2, A3, A4, and both end points of the shoulder main grooves 14c, 14d in the tire width direction are taken as A5, A6, A7, A8.

Furthermore, of the end points A1 to A4 of the two center main grooves 14a, 14b in the tire width direction, a curved line including the set of the two points A1, A3 approximate to the tire equatorial plane and/or the set of two points A2, A4 distanced from the tire equatorial plane is taken as standard profile line PL0. The standard profile line PL0 may be a circular arc, an elliptical arc, or any other curved line.

When defined as such, in the present embodiment, as illustrated in FIG. 2, profile line PL1 of the center land portion X defined by the two center main grooves 14a, 14b protrudes outward in the tire radial direction further than the standard profile line PL0.

Next, as illustrated in FIG. 2, on either side of the tire equatorial plane CL in the tire width direction, a curved line including the outermost point A2 (A4) of the center main groove 14a (14b) in the tire width direction and the end points A5, A6 (A7, A8) of the shoulder main groove 14c (14d) in the tire width direction is taken as profile line PL2 (PL3). The profile line PL2 (PL3) is a profile line shared by the sub-center land portion Y1 (Y2) and the shoulder land portion Z1 (Z2) defined outward of the center main groove 14a (14b) in the tire width direction, the shoulder land portion Z1 (Z2) defined even further outward than the sub-center land portion Y1 (Y2).

When defined as such, in the present embodiment, as illustrated in FIG. 2, the profile line PL2 (PL3) protrudes outward in the tire radial direction further than the standard profile line PL0.

Actions and the Like

In the present embodiment, as illustrated in FIG. 2, the profile line PL1, the profile line PL2, and the profile line PL3 protrude outward in the tire radial direction further than the standard profile line PL0. As a result, the following effects are obtained.

Figure 3A:
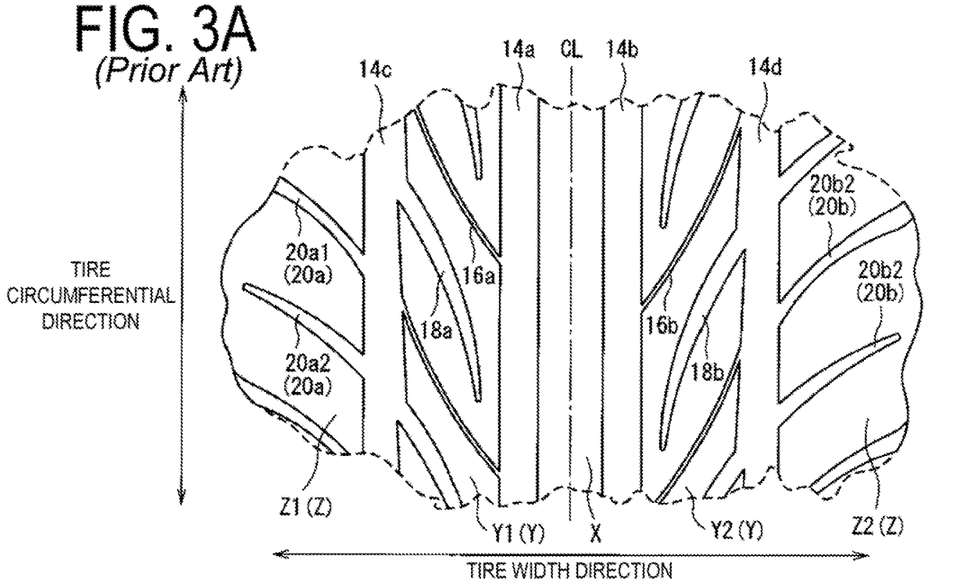
FIG. 3A illustrates a form of a conventional pneumatic tire and FIG. 3B illustrates a form of the pneumatic tire of the present embodiment.
Figure 3B:
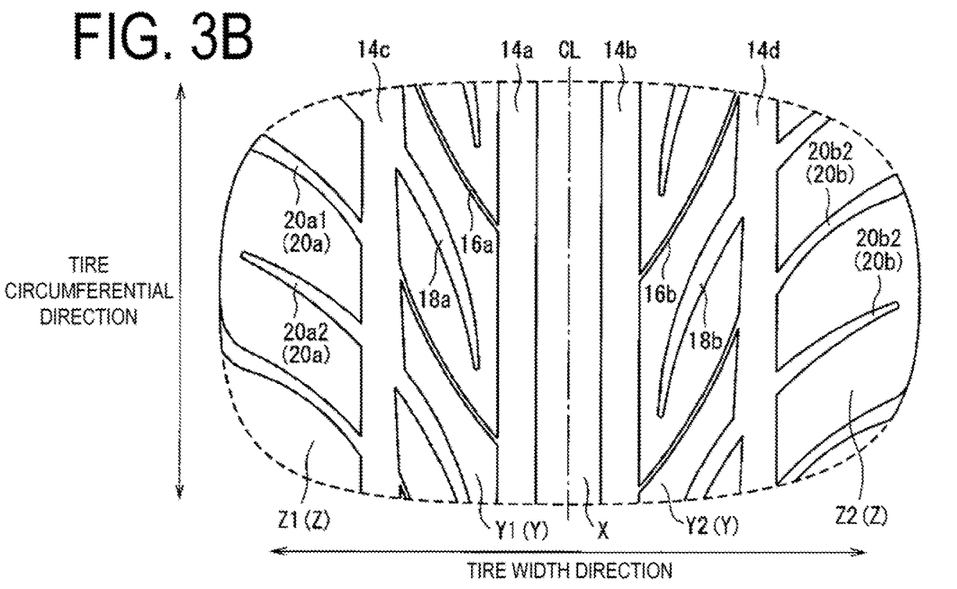

FIGS. 3A and 3B are plan views illustrating ground contact patch forms of pneumatic tires. Note that FIG. 3A illustrates a form of a conventional pneumatic tire, and FIG. 3B illustrates a form of the pneumatic tire of the present embodiment. The example illustrated in FIG. 3A has the tread pattern illustrated in FIG. 1, however the profile lines PL1, PL2, PL3 illustrated in FIG. 2 coincide with the standard profile line PL0.

In other words, in the conventional pneumatic tire, the profile lines PL1, PL2, PL3 all match the standard profile line PL0. Accordingly, as illustrated in FIG. 3A, both end portions in the tire circumferential direction at approximately the center positions in the tire width direction deform inward toward the land portions due to the low ground contact pressure of the land portions at the center positions in the tire width direction. Thus, the peripheral line of the ground contact patch takes an uneven shape (see in particular the dotted areas in FIG. 3A). The uneven shape of the peripheral line causes a ground contact length in the land portions at approximately the center positions in the tire width direction to be shortened. This in turn adversely affects contact with the ground and steering stability performance.

In comparison, in the pneumatic tire of the present embodiment, the profile lines PL1, PL2, PL3 illustrated in FIG. 2 protrude in the tire radial direction past the standard profile line PL0. Thus, the ground contact pressure of the land portions at approximately the center positions in the tire width direction can be made substantially the same as the ground contact pressure at both outer positions in the tire width direction. Accordingly, deformation inward toward the land portions can be suppressed in both end portions in the tire circumferential direction at approximately the center positions. As a result, as illustrated by the dotted line in FIG. 3B, the boundaries of the end portions of the land portions X, Y1, Y2, Z1, Z2 (applicable to both the leading edge and the trailing edge) in the tire circumferential direction are positioned on one smooth curved line. This allows for the footprint length of the land portions X, Y1, Y2, Z1, Z2 in the tire width direction to be substantially uniform, thus enhancing contact with the ground (Action 1).

Next, in the present embodiment, there is particular significance to setting the one profile line PL2 (PL3) ranging across the sub-center land portion Y1 (Y2) and the shoulder land portion Z1 (Z2), or in other words positioning the outer contour of the sub-center land portion Y1 (Y2) and the outer contour of the shoulder land portion Z1 (Z2) on the same curved line, as illustrated in FIG. 2.

In other words, by setting the one profile line PL2 (PL3) ranging across the sub-center land portion Y1 (Y2) and the shoulder land portion Z1 (Z2), the contact with the ground in the tire width direction of the sub-center land portion Y1 (Y2) and the shoulder land portion Z1 (Z2) can be enhanced. Additionally, when the sub-center land portion Y1 (Y2) and the shoulder land portion Z1 (Z2) are considered as a whole, the amount of deformation in the tire width direction of the contact with the ground can be smoothed out amongst these land portions, and in particular, the contact with the ground of the outer shoulder regions in the tire width direction can be sufficiently enhanced (Action 2).

As described above, the pneumatic tire of the present embodiment is capable of enhancing the contact with the ground, in particular in the tire width direction, of the land portions (Action 1), and smoothing out the amount of deformation in the tire width direction of the contact with the ground amongst the land portions in the shoulder regions (Action 2). According to the pneumatic tire of the present embodiment with the combination of Actions 1 and 2, superior steering stability performance (including both straight-line performance and turning performance) as well as superior uneven wear resistance performance can be achieved.

Although it is not illustrated in the drawings, the pneumatic tire according to the present embodiment described above has a meridian cross-section shape similar to that of a conventional pneumatic tire. Here, the meridian cross-section form of the pneumatic tire refers to the cross-sectional shape of the pneumatic tire on a plane normal to the tire equatorial plane. As seen in the meridian cross-section, the pneumatic tire according to the present embodiment includes bead portions, sidewall portions, shoulder portions, and the tread portion from inside to outside in the radial direction of the tire. As seen, for example, in the meridian cross-section, the pneumatic tire is provided with a carcass layer that extends from the tread portion to the bead portions on both sides and is wound around a pair of bead cores, and a belt layer and a belt reinforcing layer upon the carcass layers in that order outward in the radial direction of the tire.

The pneumatic tire according to the present embodiment can be obtained via ordinary manufacturing steps; i.e., a tire material mixing step, a tire material machining step, a green tire molding step, a vulcanization step, a post-vulcanization inspection step, etc. In particular, when manufacturing the pneumatic tire according to the present embodiment, for example, recesses and protrusions corresponding to the grooves and land portions formed in the tread pattern illustrated in FIGS. 1 and 2 are formed on the inner wall of the vulcanization mold, which is used for vulcanization.

Note that in the pneumatic tire of the present embodiment, the following method is used to determine, in particular, the profile lines PL1, PL2, PL3 illustrated in FIG. 2.

In other words, first, the shape of the standard profile line PL0 is determined. For example, when the standard profile line PL0 is a circular arc, the radius of curvature is determined. For the radius of curvature, it is important to set various values according to the tire size. In the present embodiment, the radius of curvature is a dimension from 5 to 20 times that of the cross-sectional height of the tire.

Additionally, the circular arc PL0 with a radius of curvature R0 including the inner points A1, A3 of the two center main grooves 14a, 14b in the tire width direction and the center position on the tire equatorial plane CL is determined.

Next, the circular arc PL1 with a radius of curvature R1 including the inner points A1, A3 of the two center main grooves 14a, 14b in the tire width direction is determined, the radius of curvature R1 being less than the radius of curvature R0 of the circular arc PL0 ($0.3 \leq R1/R0 \leq 0.4$).

Lastly, the circular arc PL2 (PL3) with a radius of curvature R2 (R3) including the outer point A2 (A4) of the two center main grooves 14a (14b) in the tire width direction is determined, the radius of curvature R2 (R3) being less than the radius of curvature R0 of the circular arc PL0 ($0.75 \leq R2(R3)/R0 \leq 0.95$). The circular arc PL2 (PL3) extends from the point A2 (A4) beyond the ground contact edge line E (E') outward in the tire width direction and intersects the circular arc PL0 at point P (P').

Note that the circular arc PL1 and the circular arc PL2 (PL3) intersect at the circumferential groove 14a (14b) approximate to the tire equatorial plane CL. Additionally, the point P (P') is positioned further outward in the tire width direction from the ground contact edge line E (E') by a dimension from 3% to 5% the tire ground contact width.

When the radius of curvature described above is 5 times or greater than the cross-sectional height of the tire, the standard profile line PL0 itself can be prevented from protruding excessively in the tire radial direction. Thus, the radius of curvature of the profile lines PL1, PL2, PL3 that protrude outward in the tire radial direction further than the standard profile line PL0 need not be set excessively low to achieve sufficient enhancement of the contact with the ground of the land portions. When the radius of curvature described above is 20 times or less than the cross-sectional height of the tire, the standard profile line PL0 itself can protrude sufficiently in the tire radial direction. Thus, the radius of curvature of the profile lines PL1, PL2, PL3 that protrude outward in the tire radial direction further than the standard profile line PL0 can be set sufficiently low to achieve sufficient enhancement of the contact with the ground of the land portions.

After determining the shape of the standard profile line PL0 (radius of curvature when a circular arc) as such, the end points A1 to A4 of the center main grooves 14a, 14b in the tire width direction on the standard profile line PL0 as illustrated in FIG. 2 are determined. Then, as illustrated in FIG. 2, the profile line PL1 of the center land portion X is determined together with the profile line PL2 (PL3) ranging across the sub-center land portion Y1 (Y2) and the shoulder land portion Z1 (Z2).

ADDITIONAL EMBODIMENTS

Next, Additional Embodiments 1 and 2 are described. Additional Embodiments 1 and 2 can be optionally implemented as opposed to Basic Embodiment of the pneumatic tire according to the present technology described above.

Additional Embodiment 1

In the Basic Embodiment, the profile line PL1 of the center land portion X illustrated in FIG. 2 preferably has a maximum protruding amount outward in the tire radial direction with respect to the standard profile line PL0 of from 0.2 to 0.5 mm (Additional Embodiment 1).

Figure 4:
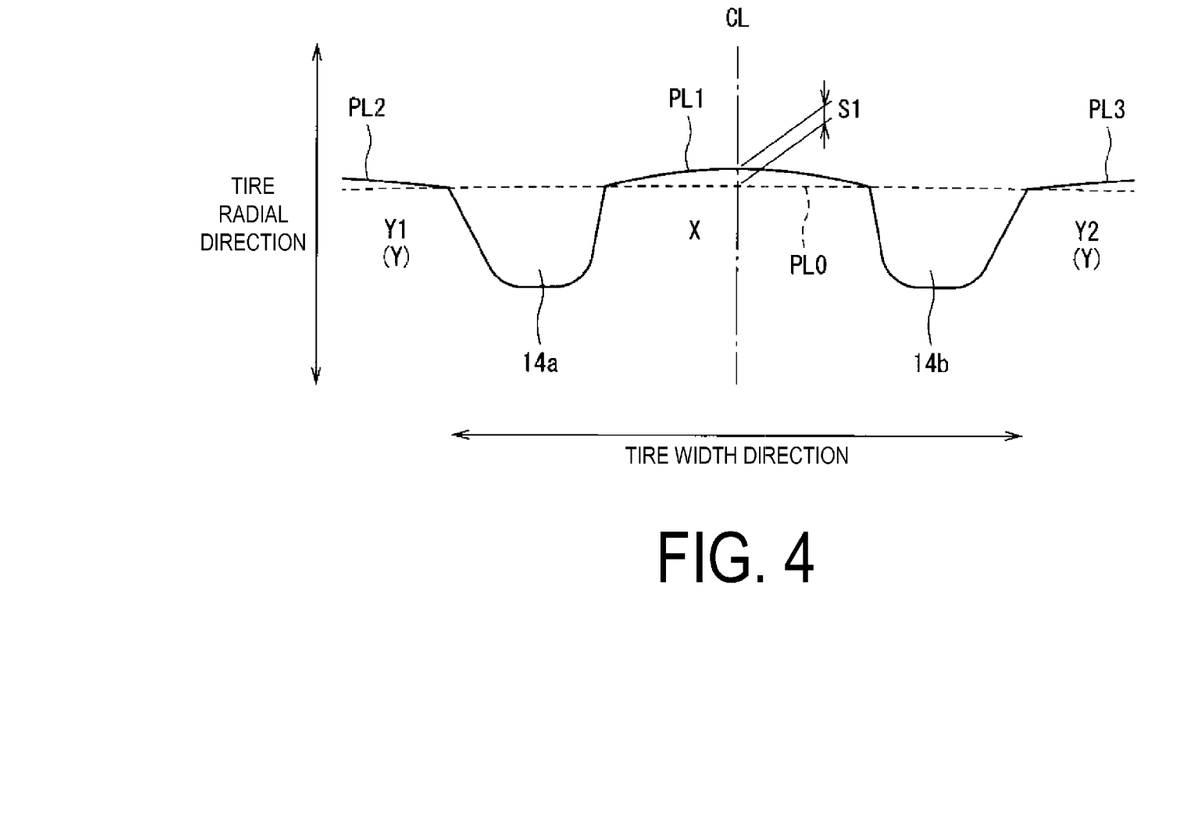
FIG. 4 is an enlarged view of the circled area B of FIG. 2.

FIG. 4 is an enlarged view of the circled area B of FIG. 2. In the present embodiment, as illustrated in FIG. 4, the profile line PL1 of the center land portion X has a maximum protruding amount S1 outward in the tire radial direction with respect to the standard profile line PL0. The maximum protruding amount S1 is the maximum dimension in the tire radial direction from the standard profile line PL0 to the profile line PL1.

When the maximum protruding amount S1 is 0.2 mm or greater, in the center land portion X, the ground contact pressure at approximately the center position in the tire width direction can be made even closer to the ground contact pressure at both outer positions in the tire width direction. Accordingly, gripping force to the road surface can be enhanced, and in particular, steering characteristics when traveling straight are enhanced and straight-line performance (steering stability performance) can be further enhanced.

Additionally, when the maximum protruding amount S1 is 0.5 mm or less, in the center land portion X, the protruding amount in the tire radial direction at approximately the center position in the tire width direction can be suppressed. Thus, the amount of wear at approximately the center position is not excessive compared to the amount of wear at other positions, and uneven wear resistance performance can be further enhanced.

Note that when the maximum protruding amount S1 is from 0.3 to 0.4 mm, the effects described above can be obtained at an even higher level.

Additional Embodiment 2

Figure 5:
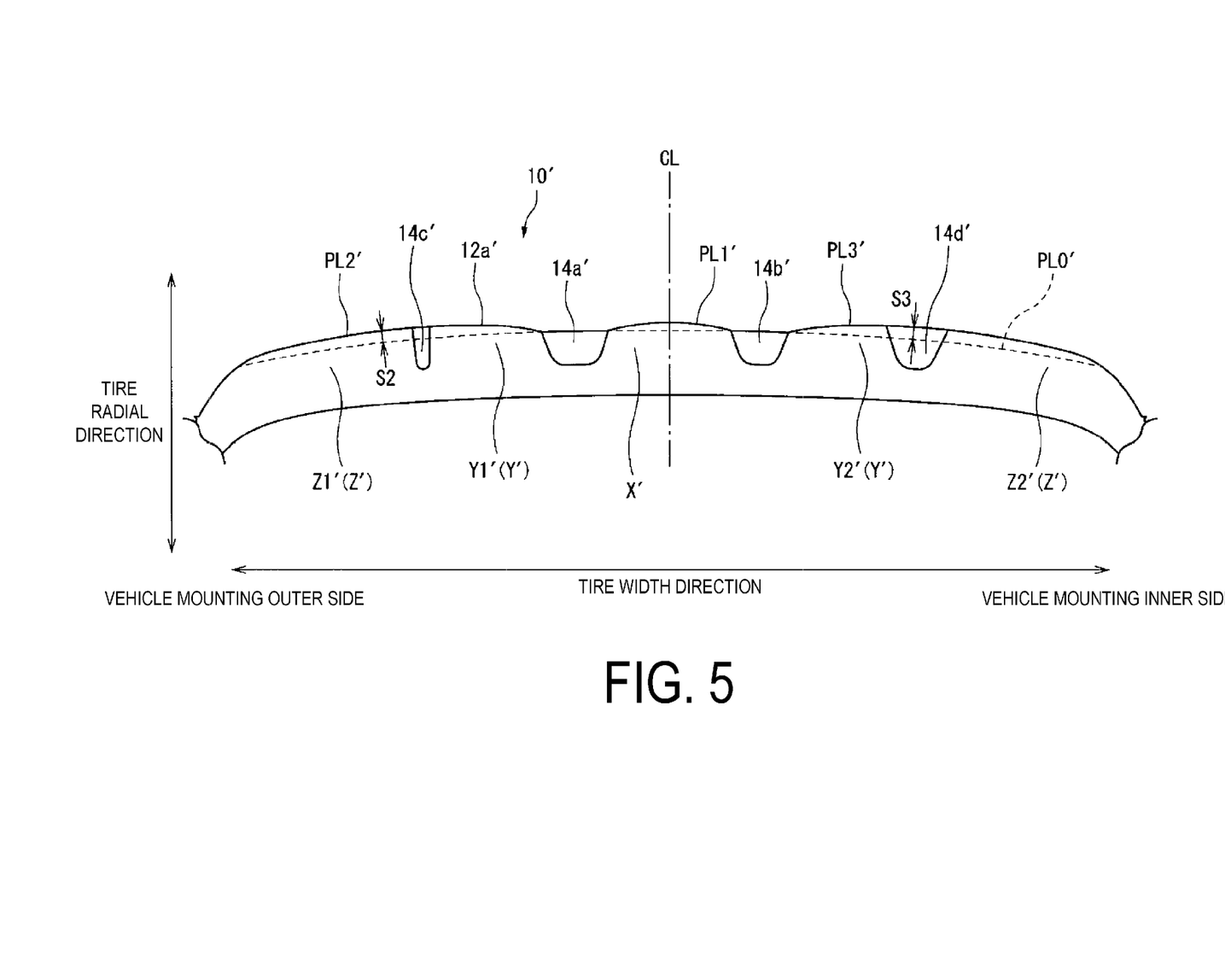
FIG. 5 is a tire meridian cross-sectional view of a modified example of the example illustrated in FIG. 2.

FIG. 5 is a tire meridian cross-sectional view of a modified example of the example illustrated in FIG. 2. In other words, the example illustrated in FIG. 5 has a similar tread pattern to that illustrated in FIG. 1 except that the pattern on either side of the tire equatorial plane CL in the tire width direction being asymmetrical. In other words, the example illustrated in FIG. 5 has a specified vehicle mounting direction. Note that in FIG. 5, reference sign 10' denotes a tread portion, reference sign 12' denotes a tread surface, reference signs 14a', 14b', 14c', 14d' denote circumferential grooves, and reference signs X', Y1', Y2', Z1', Z2' denote land portions. Additionally, in FIG. 5, reference sign PL0' denotes a standard profile line, and reference signs PL1', PL2', PL3' denote profile lines.

Furthermore, in FIG. 5, reference sign S2 (S3) denotes the maximum dimension in the tire radial direction from the standard profile line PL0' to the profile line PL2' (PL3').

In Basic Embodiment and Basic Embodiment with Additional Embodiment 1 applied, as illustrated in FIG. 5, profile line PL2' (PL3') of the sub-center land portion Y1' (Y2') and the shoulder land portion Z1' (Z2') preferably has a maximum protruding amount S2 (S3) outward in the tire radial direction with respect to the standard profile line PL0' of from 0.6 to 2.0 mm; additionally, the maximum protruding amount S2 (S3) is preferably greater on the profile line PL2' on the vehicle mounting inner side than the profile line PL3' on the vehicle mounting outer side (Additional Embodiment 2).

When the maximum protruding amount S2 (S3) is 0.6 mm or greater, in the sub-center land portion Y1' (Y2') and the shoulder land portion Z1' (Z2'), the ground contact pressure at approximately the center position in the tire width direction can be made even closer to the ground contact pressure at both outer positions in the tire width direction. Accordingly, gripping force to the road surface can be enhanced, and in particular, steering characteristics when traveling straight are enhanced and straight-line performance (steering stability performance) can be further enhanced.

Additionally, when the maximum protruding amount S2 (S3) is 2.0 mm or less, in the sub-center land portion Y1' (Y2') and the shoulder land portion Z1' (Z2'), the protruding amount in the tire radial direction at the center position in the tire width direction can be suppressed. Thus, the amount of wear at approximately the center position is not excessive compared to the amount of wear at other positions, and uneven wear resistance performance can be further enhanced.

Note that when the maximum protruding amount S2 (S3) is from 0.9 to 1.7 mm, the effects described above can be obtained at an even higher level.

Additionally, in the present embodiment, the maximum protruding amount S2 (S3) is greater on the profile line PL2' on the vehicle mounting inner side than the profile line PL3' on the vehicle mounting outer side. In other words, in the present embodiment, the dimensions in the tire radial direction of the land portions on the vehicle mounting outer side where the amount of wear is great while turning (the sub-center land portion Y1' (Y2') and the shoulder land portion Z1' (Z2')) are greater than that of the land portions corresponding to the vehicle mounting inner side. Accordingly, the tire from the start to end of its service life does not differ greatly in terms of the amount of wear at the land portions on the vehicle mounting outer side and inner side, thus uneven wear resistance performance can be further enhanced.

EXAMPLES

Working Example Group 1

Working Example Group 1 described below is a working example group of pneumatic tires without a specified vehicle mounting direction.

Pneumatic tires of Working Examples 1 to 5 were manufactured with a tire size of 235/40ZR18 (95Y) and included the tread pattern illustrated in FIG. 1 and the profile lines PL1, PL2, PL3 of the tread surface illustrated in FIG. 2. Note that the profile lines of the tread surface of the pneumatic tires of Working Examples 1 to 5 had details with the conditions indicated in Table 1 below.

Additionally, pneumatic tires of Conventional Example 1 were fabricated with a tire size of 235/40ZR18 (95Y) and had the same configuration as the pneumatic tires of Working Example 1 except that the profile lines PL1, PL2, PL3 of the tread surface illustrated in FIG. 2 coincided with the standard profile line PL0.

The test tires thus manufactured for Working Examples 1 to 5 and Conventional Example 1 were mounted on 18×8.5 J rims at 230 kPa to be fitted to a sedan type passenger vehicle with an engine displacement of 2000 cc. Evaluation was carried out on steering stability performance 1 (straight-line performance), steering stability performance 2 (turning performance), and uneven wear resistance performance.

Steering Stability Performance 1 (Straight-line Performance)

On a dry road surface, performance evaluation was carried out on vehicle stability when traveling straight. Then, the evaluation results were indexed for evaluation with the result for Conventional Example 1 taken as the reference (100). Higher index values indicate better steering stability performance 1 (straight-line performance).

Steering Stability Performance 2 (Turning Performance)

On a dry road surface, performance evaluation was carried out on vehicle stability when turning. Then, the evaluation results were indexed for evaluation with the result for Conventional Example 1 taken as the reference (100). In the evaluation, higher index values indicate better steering stability performance 2 (turning performance).

Uneven Wear Resistance Performance

After traveling for 1000 km on a dry road surface, the amount of wear of the center land portion X and the shoulder land portion Z1 (Z2) were measured. For the shoulder land portions, the amount of wear on both sides in the tire width direction were averaged, then an amount of wear ratio between the central land portion and the shoulder land portion was calculated. Then, the calculated results were indexed for evaluation with the result for Conventional Example 1 taken as the reference (100). In the evaluation, higher index values indicate better uneven wear resistance performance.

The evaluation results are shown in Table 1.

shape), were superior in steering stability performances 1 and 2 and uneven wear resistance performance to the pneumatic tire of Conventional Example 1, which was outside of the technical scope of the present technology.

Working Example Group 2

Working Example Group 2 described below is a working example group of pneumatic tires with a specified vehicle mounting direction.

Pneumatic tires of Working Examples 6 to 10 were manufactured with a tire size of 235/40ZR18 (95Y) and included a tread pattern similar to the tread pattern illustrated in FIG. 1 and the profile lines PL1', PL2', PL3' of the tread surface illustrated in FIG. 5. Note that the profile lines of the tread surface of the pneumatic tires of Working Examples 6 to 10 had details with the conditions indicated in Table 2 below.

Additionally, pneumatic tires of Conventional Example 2 were fabricated with a tire size of 235/40ZR18 (95Y) and had the same configuration as the pneumatic tires of Working Example 6 except that the profile lines PL1', PL2', PL3' of the tread surface illustrated in FIG. 5 coincided with the standard profile line PL0'.

The test tires thus manufactured for Working Examples 6 to 10 and Conventional Example 2 were mounted on 18×8.5 J rims at 230 kPa to be fitted to a sedan type passenger vehicle with an engine displacement of 2000 cc. Evaluation was carried out on steering stability performance 1 (straight-line performance), steering stability performance 2 (turning

TABLE 1

|  | Conventional Example 1 | Working Example 1 | Working Example 2 | Working Example 3 | Working Example 4 | Working Example 5 |
|---|---|---|---|---|---|---|
| Maximum protruding amount outward in tire radial direction of center land portion profile line with respect to standard profile line (mm) | 0 | 0.1 | 0.25 | 0.35 | 0.35 | 0.35 |
| Maximum protruding amount outward in tire radial direction of sub-center land portion and shoulder land portion profile line with respect to standard profile line (mm) | 0 | 0.5 | 0.5 | 0.5 | 0.8 | 1.3 |
| Steering stability performance 1 (straight-line performance) | 100 | 101 | 103 | 105 | 105 | 105 |
| Steering stability performance 2 (turning performance) | 100 | 102 | 102 | 102 | 105 | 108 |
| Uneven wear resistance performance | 100 | 102 | 103 | 103 | 105 | 107 |

As seen in Table 1, for pneumatic tires without a specified vehicle mounting direction, the pneumatic tires of Working Examples 1 to 5, which were within the technical scope of the present technology (had enhanced land portion surface performance), and uneven wear resistance performance. Evaluation was carried out according to the method employed for Working Example Group 1. The evaluation results are shown in Table 2.

TABLE 2

|  | Conventional Example 2 | Working Example 6 | Working Example 7 | Working Example 8 | Working Example 9 | Working Example 10 |
| --- | --- | --- | --- | --- | --- | --- |
| Maximum protruding amount outward in tire radial direction of center land portion profile line with respect to standard profile line (mm) | 0 | 0.1 | 0.25 | 0.35 | 0.35 | 0.35 |
| Maximum protruding amount outward in tire radial direction of sub-center land portion and shoulder land portion profile line with respect to standard profile line (mm) | 0 | 0.5 | 0.5 | 0.5 | 0.8 | 1.3 |
| Steering stability performance 1 (straight-line performance) | 100 | 101 | 103 | 105 | 105 | 105 |
| Steering stability performance 2 (turning performance) | 100 | 102 | 102 | 102 | 105 | 108 |
| Uneven wear resistance performance | 100 | 102 | 103 | 103 | 105 | 107 |

As seen in Table 2, for pneumatic tires with a specified vehicle mounting direction, the pneumatic tires of Working Examples 6 to 10, which were within the technical scope of the present technology (had enhanced land portion surface shape), were superior in steering stability performances 1 and 2 and uneven wear resistance performance to the pneumatic tire of Conventional Example 2, which was outside of the technical scope of the present technology.

The invention claimed is:

1. A vehicle having a pneumatic tire mounted thereon, the pneumatic tire comprising:
   on either side of a tire equatorial plane in a tire width direction,
   one center main groove extending in a tire circumferential direction;
   one shoulder main groove extending in the tire circumferential direction outward from the center main groove in the tire width direction; and
   five types of land portions extending in the tire circumferential direction, the land portions being defined by the four main grooves; wherein
   in a tire meridian cross-section,
   a profile line of a center land portion defined by the two center main grooves protrudes outward in a tire radial direction further than a standard profile line, the standard profile line being a curved line including both end points of both of the two center main grooves in the tire width direction,
   profile lines of sub-center land portions and shoulder land portions defined outward of the two center main grooves in the tire width direction protrude outward in the tire radial direction further than the standard profile line, the shoulder land portions being defined even further outward than the sub-center land portions, the profile lines of the sub-center land portions and the shoulder land portions each including an outermost point of the corresponding center main groove in the tire width direction and both end points of the corresponding shoulder main groove in the tire width direction and being present on either side of the tire equatorial plane in the tire width direction,
   both end points of the shoulder main groove on either side of the tire equatorial plane in the tire width direction are radially outward of the standard profile line, and
   the profile lines of the sub-center land portions and the shoulder land portions have a maximum protruding amount outward in the tire radial direction with respect to the standard profile line of from 0.6 to 2.0 mm, the maximum protruding amount of the profile line on a vehicle mounting inner side being greater than the maximum protruding amount of the profile line on a vehicle mounting outer side.

2. The vehicle having the pneumatic tire according to claim 1, wherein the profile line of the center land portion has a maximum protruding amount outward in the tire radial direction with respect to the standard profile line of from 0.2 to 0.5 mm.

3. The vehicle having the pneumatic tire according to claim 1, wherein the maximum protruding amount of the profile line on the vehicle mounting inner side is greater than the maximum protruding amount of the profile line on the vehicle mounting outer side when the pneumatic tire is mounted on a vehicle.

4. The vehicle having the pneumatic tire according to claim 1, wherein the pneumatic tire having designated vehicle mounting inner and outer sides functions to improve uneven wear resistance performance of the pneumatic tire.

* * * * *